United States Patent [19]
Watanabe

[11] Patent Number: 6,098,055
[45] Date of Patent: Aug. 1, 2000

[54] BANKING SYSTEM EQUIPPED WITH A RADIO LINKED PORTABLE TERMINAL

[75] Inventor: Mitsuhiro Watanabe, Tokyo, Japan

[73] Assignee: NEC Corporation, Tokyo, Japan

[21] Appl. No.: 08/795,201

[22] Filed: Feb. 5, 1997

[30] Foreign Application Priority Data

Feb. 7, 1996 [JP] Japan .................................. 8-020337

[51] Int. Cl.⁷ .................................................. H04K 1/00
[52] U.S. Cl. .............................................. 705/73; 705/75
[58] Field of Search ................................ 380/24, 25, 30; 235/380; 705/21, 73, 75, 79

[56] References Cited

U.S. PATENT DOCUMENTS

| | | | |
|---|---|---|---|
| 4,794,236 | 12/1988 | Kawana et al. | 235/492 |
| 5,202,825 | 4/1993 | Miller et al. | 705/21 |
| 5,208,446 | 5/1993 | Martinez | 235/380 |
| 5,221,838 | 6/1993 | Gutman et al. | 235/380 |
| 5,371,794 | 12/1994 | Diffie et al. | 380/30 |
| 5,412,716 | 5/1995 | Nevoux et al. | 380/24 |
| 5,428,684 | 6/1995 | Akiyama et al. | 380/25 |
| 5,473,690 | 12/1995 | Grimonprez et al. | 705/73 |
| 5,539,825 | 7/1996 | Akiyama et al. | 380/24 |

FOREIGN PATENT DOCUMENTS

| | | |
|---|---|---|
| 0 159 651 | 10/1985 | European Pat. Off. . |
| 0 421 808 | 4/1991 | European Pat. Off. . |
| 0 668 579 | 8/1995 | European Pat. Off. . |
| 0 724 238 | 7/1996 | European Pat. Off. . |
| 63-244288 | 10/1988 | Japan . |
| 64-88891 | 4/1989 | Japan . |
| 3-092966 | 4/1991 | Japan . |
| 3-92966 | 4/1991 | Japan . |
| 5-94458 | 4/1993 | Japan . |
| 6-501329 | 2/1994 | Japan . |
| 6-121075 | 4/1994 | Japan . |
| 6-268777 | 9/1994 | Japan . |
| 92 11598 | 7/1992 | WIPO . |
| 95 20195 | 7/1995 | WIPO . |
| 96 13814 | 5/1996 | WIPO . |
| 96 26505 | 8/1996 | WIPO . |

OTHER PUBLICATIONS

"Prevalence of Smart Cards Grew in 1995; Industry Has Work Cut Out for It in 1996", In: Report on Electronic Commerce 3[1], Jan. 9, 1996.

"This is real cash—Mondex's Challenge," "Doors," 1[1], Nov. 1995, pp. 10 through 13.

*Primary Examiner*—Salvatore Cangialosi
*Attorney, Agent, or Firm*—Foley & Lardner

[57] ABSTRACT

In order to provide a banking system having an IC card available anytime anywhere with no risk of the security information plagiary because of the missing IC card, no complexity of the IC card usage, nor problem of the discharged battery, a banking system of the present invention comprises radio communication means to be connected to a center terminal (5) of a financial organization (4) by way of a radio communication network for drawing an amount from and depositing an amount to a bank account in the financial organization (4), the bank account being identified by a bank password. The radio communication means includes a radio linked portable terminal (1) and an IC card (2) to be connected to the radio linked portable terminal, the IC card comprising a memory for storing information of an available amount reserved for the IC card (2) and a processor for adding an amount drawn from the bank account to the available amount and subtracting an amount to be deposited to the bank account from the available amount.

8 Claims, 12 Drawing Sheets

BANKING SYSTEM EQUIPPED WITH A RADIO LINKED PORTABLE TERMINAL

BACKGROUND OF THE INVENTION

The present invention relates to a banking system equipped with a radio linked portable terminal, and particularly to that wherein a radio linked portable terminal is used together with an IC card for drawing or depositing electronic money from/to a bank.

The electronic purse system for settling a bank account making use of an IC card is well known, wherein the IC card is issued in advance from the bank to a customer. The customer charges the IC card with an amount by way of an ATM (Automatic Teller Machine) and uses it for payment when shopping for some goods.

The electronic purse system can provide a safe and convenient settlement, since no cash need be carried about with the customer and consequently, no cash need be transferred by the armored car from the store to the bank.

Furthermore, compared to a prepaid card, for example, with which the payable amount is limitted, the IC card can be used for shopping even when the registered amount becomes to zero, by revising the amount through ten-keys provided thereon, on condition that there is left some amount to be used in the bank account of the customer.

Examples of the above electronic purse system are disclosed in Japanese patent applications laid open as Provisional Publications No. 92966/'91 and No. 94458/'93.

In the prior art disclosed in the Provisional Publication No. 92966/'91, an IC card is provided with a microcomputer chip together with a display and input-keys. After activating it by closing a power switch and entering his password, a customer uses it for drawing money from an ATM or paying by way of a store terminal in the same way as a prepaid card. In the Provisional Publication No. 94458, there is disclosed an electronic purse system equipped with store terminals identifying an IC card with a "bank key" provided therein, which is unique for each user and variable according to time passage.

However, there are still left various problems in the electronic purse system.

First, the time and place are limited for charging the IC card, that is, for revising the amount registered therein, because each IC card is to be charged by way of an ATM installed in each corresponding financial window.

Second, there is a risk of security information plagiary when the IC card is lost or stolen, because the conventional IC card, provided with a display and input-keys for entering the password or available amount, can be easily misused once the password is detected.

Third, the usage of the IC card is a little complicated, because the IC card is to be mounted to an ATM after being activated with its own password and then another password for the ATM must be input when it is charged, and when it is used for a payment at a store, it must be activated in advance by closing its power switch and entering the password.

Fourth, the IC card can not be used when its battery is discharged, because an IC card can not function without a power supply, disabling its new charging or even using the charged amount.

SUMMARY OF THE INVENTION

Therefore, a primary object of the present invention is to provide a banking system equipped with a radio linked portable terminal, where is no risk of the security information plagiary because of the missing IC card, no complexity of the IC card usage, nor the problem of the discharged battery.

In order to achieve this object, a banking system of the present invention comprises radio communication means to be connected to a center terminal of a financial organization by way of a radio communication network for drawing an amount from and depositing an amount to a bank account in the financial organization, the bank account being identified by a bank password.

The radio communication means includes a radio linked portable terminal and an IC card to be connected to the radio linked portable terminal, the IC card comprising a memory for storing information of an available amount reserved for the IC card and a processor for adding an amount drawn from the bank account to the available amount and subtracting an amount to be deposited to the bank account from the available amount.

Therefore, the IC card can be charged at anytime at anywhere without ATM.

The IC card, having no input key nor display and supplied from the radio linked portable terminal, further comprises means for confirming coincidence of a password entered from outside with the bank password stored in cryptogram therein making use of a public-key crypto-system.

Therefore, there is little risk of information plagiarism therefrom because of password leakage, and the guarded information could not be used illegally even if it were read out, in the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts, and:

DETAILED DESCRIPTION OF THE PREFERRED EMBODIMENTS

Now, embodiments of the present invention will be described in connection with the drawings.

Figure 1:
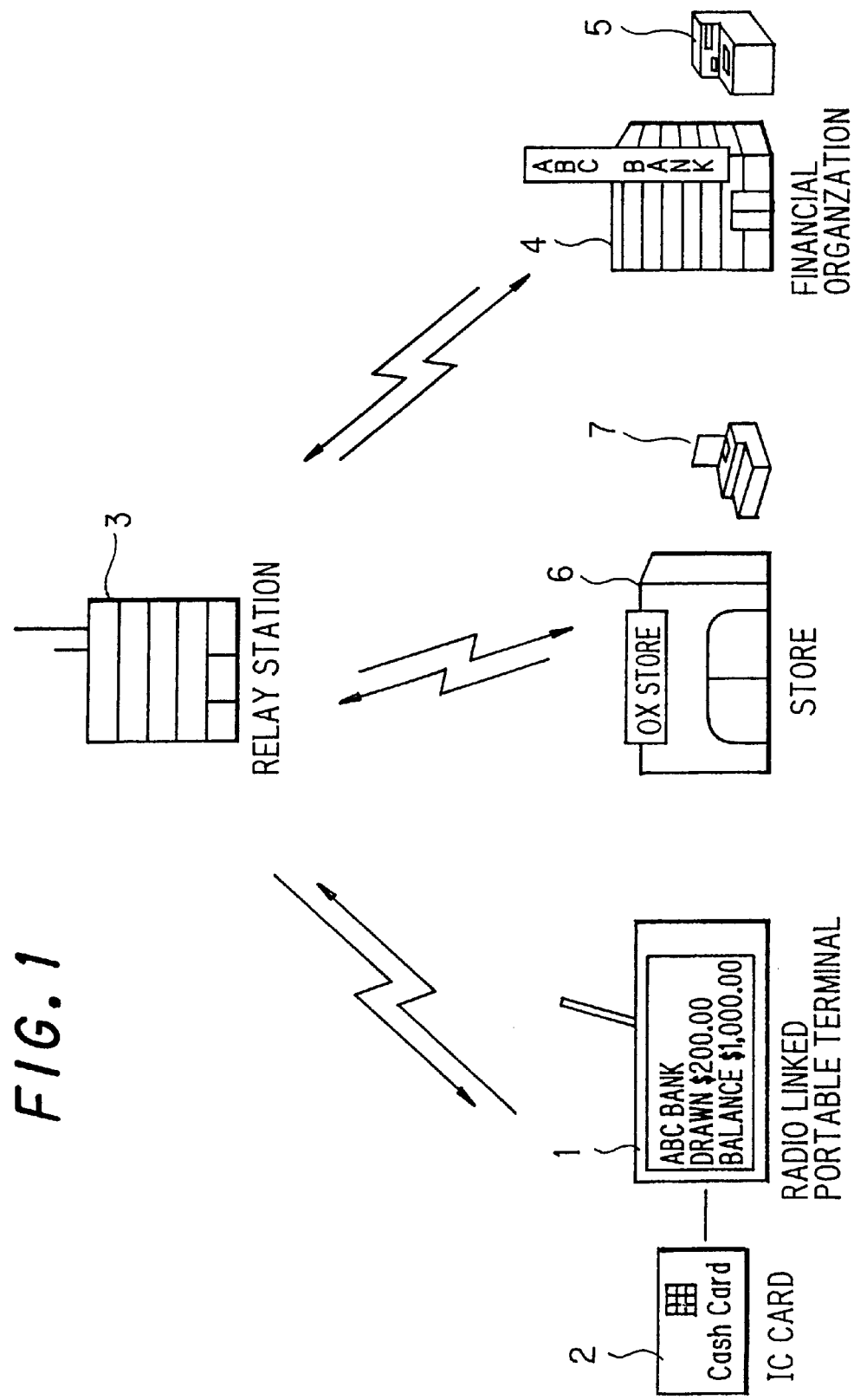
FIG. 1 illustrates a banking system of the present invention.

FIG. 1 illustrates a banking system of the present invention, comprising a radio linked portable terminal 1, and an IC card 2 to be inserted therein. A center terminal 5 in a financial organization 4 is linked with the radio linked portable terminal 1 and with a register terminal 7 of a store 6 by way of a relay station 3.

The financial organization 4 administrates banking information of its customers. When an amount is entered by an input device provided on the radio linked portable terminal 1, it is transmitted to the financial organization 4 through the relay station 3 and the center terminal 5. Then, the amount is drawn from the account of the customer to be reserved and charged in the IC card 2.

When the customer having the IC card 2 shops in the store 6, the IC card 2 is inserted in the register terminal 7 of the store 6. Then, an amount to be paid to the store 6 is drawn from the amount registered in the IC card 2. The store 6 bills the amount to the financial organization 4 through the register terminal 7, the relay station 3 and the center terminal 5 referring to customer information read out from the IC card 2. The financial organization 4 pays the corresponding amount into account of the store 6 from the amount previously reserved for the IC card 2 of the customer.

Figure 2:
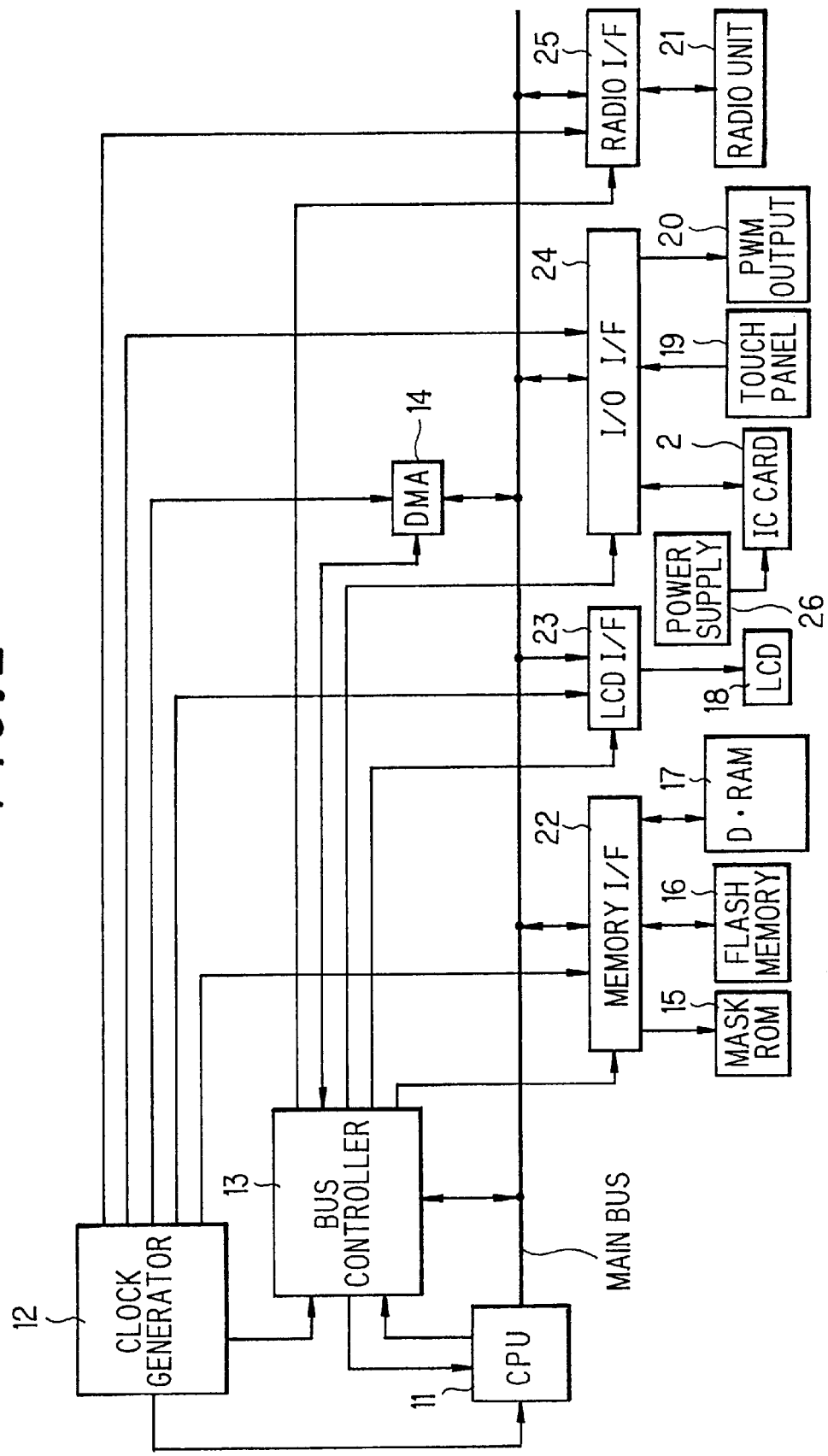
FIG. 2 is a block diagram illustrating a configuration of an embodiment of the radio linked portable terminal 1 of FIG. 1.

Now, a configuration of the radio linked portable terminal 1 is described referring to a block diagram of FIG. 2 illustrating an embodiment thereof, comprising a CPU (Central Processor Unit) 11, a clock generator 12, a bus controller 13, a DMA (Dynamic Memory Access) controller 14, a mask ROM (Read Only Memory) 15, a flash memory 16, a DRAM (Dynamic Random Access Memory) 17, a LCD (Liquid Crystal Display) 18, a touch panel 19, a PWM (Pulse Width Modulation) output 20, a radio unit 21, a memory interface 22, a LCD interface 23, an I/O interface 24, a radio interface 25, and an IC card power supply 26.

The CPU 11 is a core for executing software provided for the radio linked portable terminal 1 of the invention, such as an OS (Operating system) and other application programs. The OS performs a multitask operation, executing application programs for the electronic settlement, a protocol program for the radio communication, a decoding program for the touch panel 19 and so on in time-sharing.

The clock generator 12 generates a clock signal used in the radio linked portable terminal 1.

The bus controller 13 takes charge of usage arbitration of the main bus connecting the CPU 11, the DMA controller 14, the memory interface 22, the LCD interface 23, the I/O interface 24 and the radio interface 25.

The DMA controller 14 controls data transfer among the mask ROM 15, the flash memory 16, the DRAM 17, the LCD 18, the memory interface 22, the LCD interface 23, the I/O interface 24 and the radio interface 25, to be performed automatically when the main bus is not accessed by the CPU 11.

In the mask ROM 15, the OS and other basic programs of the radio linked portable terminal 1 are prepared.

In the flash memory 16, there is provided basic software such as device drivers for controlling read/write of the IC card 2, the touch panel 19 and the PWM output 20 or application programs for exchanging the radio communication protocol, performing the purse function by administrating money in-out, coding/decoding of amount information, store codes, account number, password, etc., and so on.

The DRAM 17 is mainly used for a work memory for the application programs and the I/O devices, a VRAM (Video RAM) for the LCD 18, and a buffer for data received through the radio interface 25.

The LCD 18 displays necessary information such as guidance information for accessing the financial organization 4, or changing the password used for obtaining account information and so on, as a display device of the radio linked portable terminal 1.

The touch panel 19 provided overlapped on the LCD 18 takes charge of input device of the radio linked portable terminal 1, detecting touched position thereof where a virtual keyboard, ten-keys or selection buttons are displayed by the LCD 18, on which also response information concerning the detected position is displayed to be confirmed by the customer.

The PWM output 20 is an audio signal output device for outputting speech guidance synchronized with the guidance information displayed on the LCD 18 for accessing the financial organization 4, for example.

Communication with outer systems of the radio linked portable terminal 1 is performed through the radio unit 21. By way of a radio wave such as used in a pager system, penetrating almost all buildings, the radio linked portable terminal 1 is able to draw its account from almost everywhere.

The memory interface 22 interfaces the mask ROM 15, the flash memory 16 and the DRAM 17 with other devices.

The LCD interface 23 mediates control signal exchange between the LCD 18 and the CPU 11 or the DMA controller 14. LCD data including stratum information prepared in the DRAM 17 are transferred to the LCD 18 after converted into display data by the LCD interface 23, under the control of the DMA controller 14.

With the I/O interface 24 are connected the IC card 2, the touch panel 19 and the PWM output 20.

The radio interface 25 takes charge of interfacing other devices with the radio unit 21 for communicating with the relay station 3.

For supplying the IC card 2, the IC card power supply 26 is provided.

Here, in the embodiment, the IC card 2, having a size similar to a credit card, to be connected to the I/O interface 24 is also equipped with a CPU and is able to return response data after processing input data. Detail of the IC card 2 will be described afterwards.

Now, more detailed configuration of each interface will be described.

Figure 3:
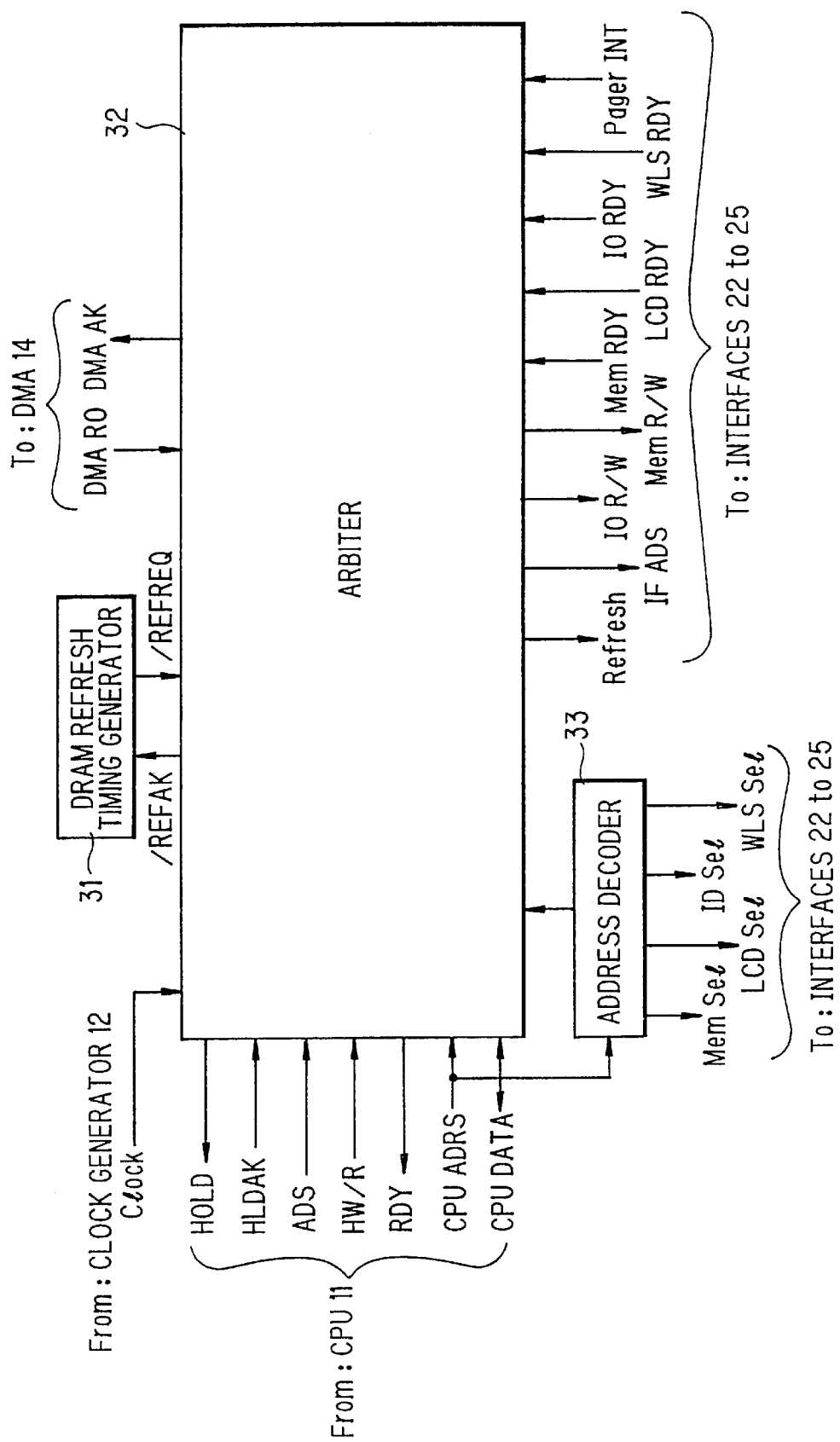
FIG. 3 is a block diagram illustrating the bus controller 13 of FIG. 2.

FIG. 3 is a block diagram illustrating the bus controller 13, comprising a DRAM refresh timing generator 31, an arbiter 32 and an address decoder 33.

The DRAM refresh timing generator 31 requires memory refreshment of the DRAM 17 to the arbiter 32, counting timings for the DRAM 17 to be refreshed;

the arbiter 32 performs arbitration of the main bus usage among the CPU 11 and the interfaces 22 to 25, according to priorities each assigned for each of the interfaces 22 to 25; and the address decoder 33 generates signals for selecting areas of each interfaces 22 to 25 to be accessed by the CPU 11 according to designated address data.

Abbreviations of signals such as HOLD, RDY (ready), etc., and their destination being described in FIG. 3, intricate description is omitted, here, which is the same with FIGS. 4 to 7.

Figure 4:
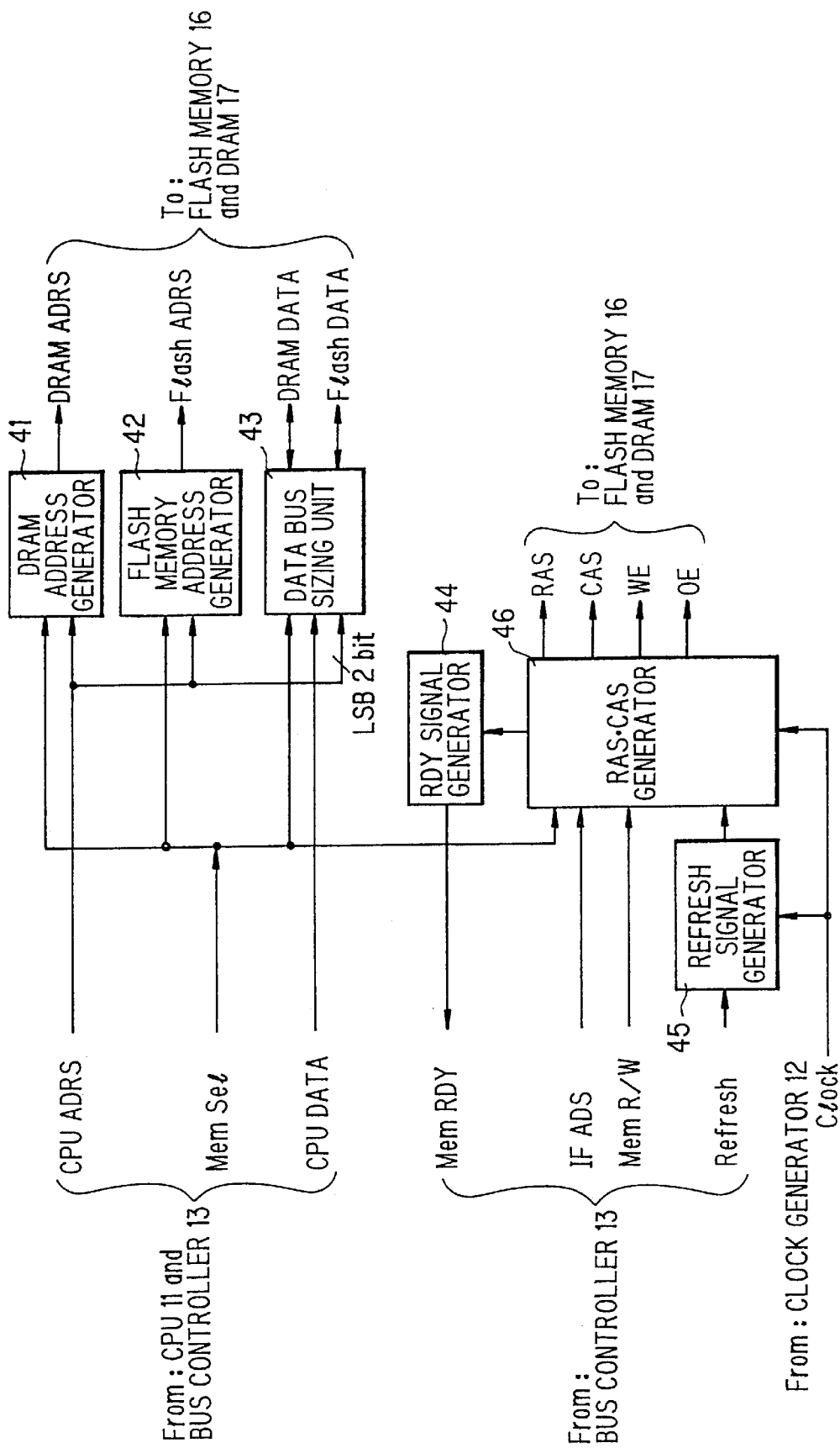
FIG. 4 is a block diagram illustrating the memory interface 22 of FIG. 2.

FIG. 4 is a block diagram illustrating the memory interface 22, comprising a DRAM address generator 41, a flash memory address generator 42, a data bus sizing unit 43, a RDY signal generator 44, a refresh signal generator 45 and a RAS/CAS (Row Address Strobe/Column Address Strobe) generator 46.

The DRAM address generator 41 converts address data of the DRAM 17 to be accessed by the CPU 11 into row and column addresses of the DRAM 17;

the flash memory address generator 42 converts address data of the flash memory 16 to be accessed by the CPU 11 into address signals appropriate for the flash memory 16;

the data bus sizing unit 43 converts data transferred through the main bus into data of a bit width appropriate for each of the DRAM 17 and the flash memory 16, and converts them vice-versa. For example, data of 16 bits supplied from the main bus is divided into data of upper 8 bits and lower 8 bits to be stored in two different addresses of the flash memory 16;

the RDY signal generator 44 returns RDY signals replying to IF/ADS (InterFace Address Selection) signals delivered from the bus controller 13;

the refresh signal generator 45 generates RAS/CAS at each refreshing timing of the DRAM 17 triggered by the refresh timing signal from the bus controller 13; and the RAS/CAS generator 46 generates signals for accessing and refreshing the DRAM 17.

Figure 5:
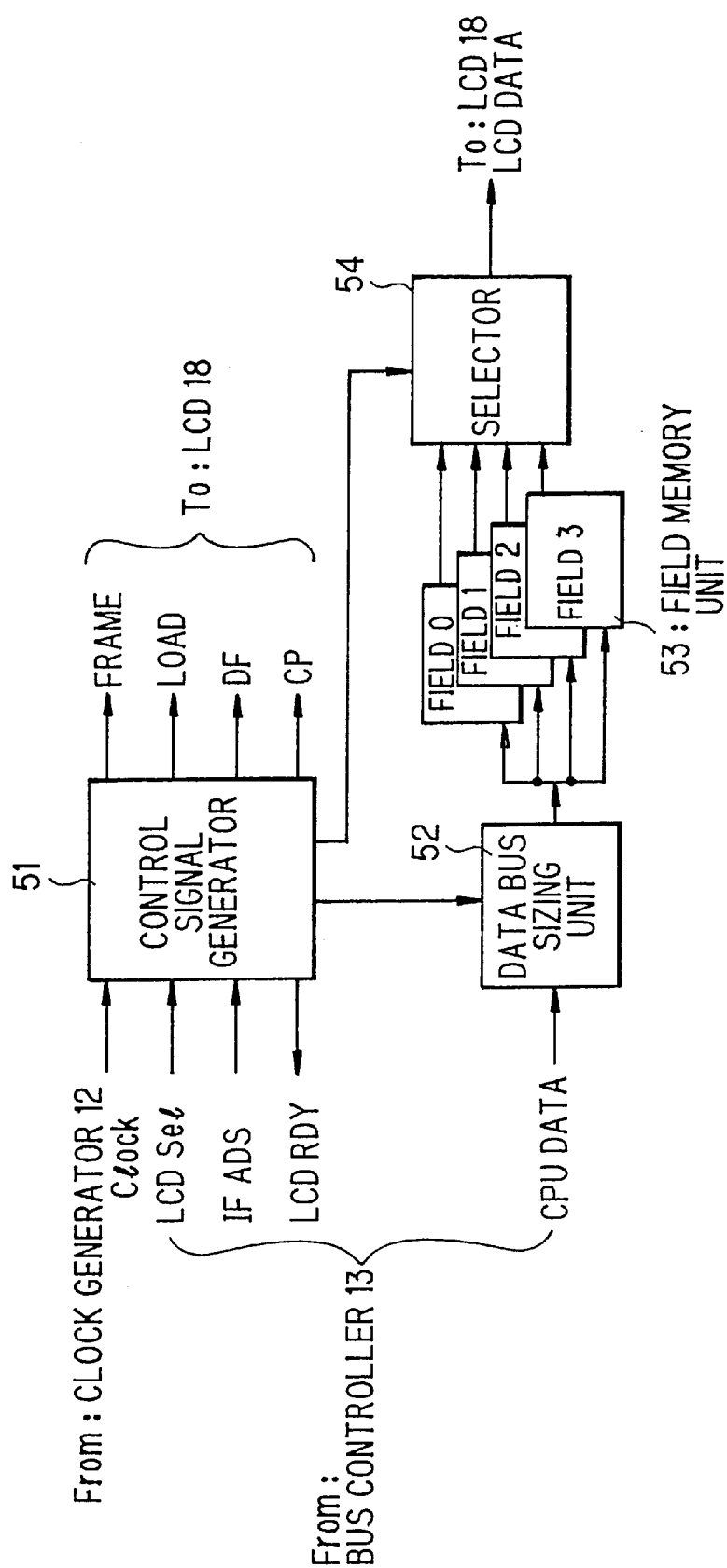
FIG. 5 is a block diagram illustrating a configuration of the LCD interface 23 of FIG. 2.

FIG. 5 is a block diagram illustrating configuration of the LCD interface 23, comprising a control signal generator 51, a data bus sizing unit 52, a field memory unit 53 and a selector 54.

The control signal generator 51 generates control signals for controlling the data bus 52, the selector 54 and the LCD 18, including frame number signal, line data load signal, LCD drive voltage alternation signal, shift, register clock signal, etc., for driving the LCD 18; and LCD display data are reformed by the data bus sizing unit 52 and written in each field of the field memory unit 53 to be selected by the selector 53 and displayed on the LCD 18.

Figure 6:
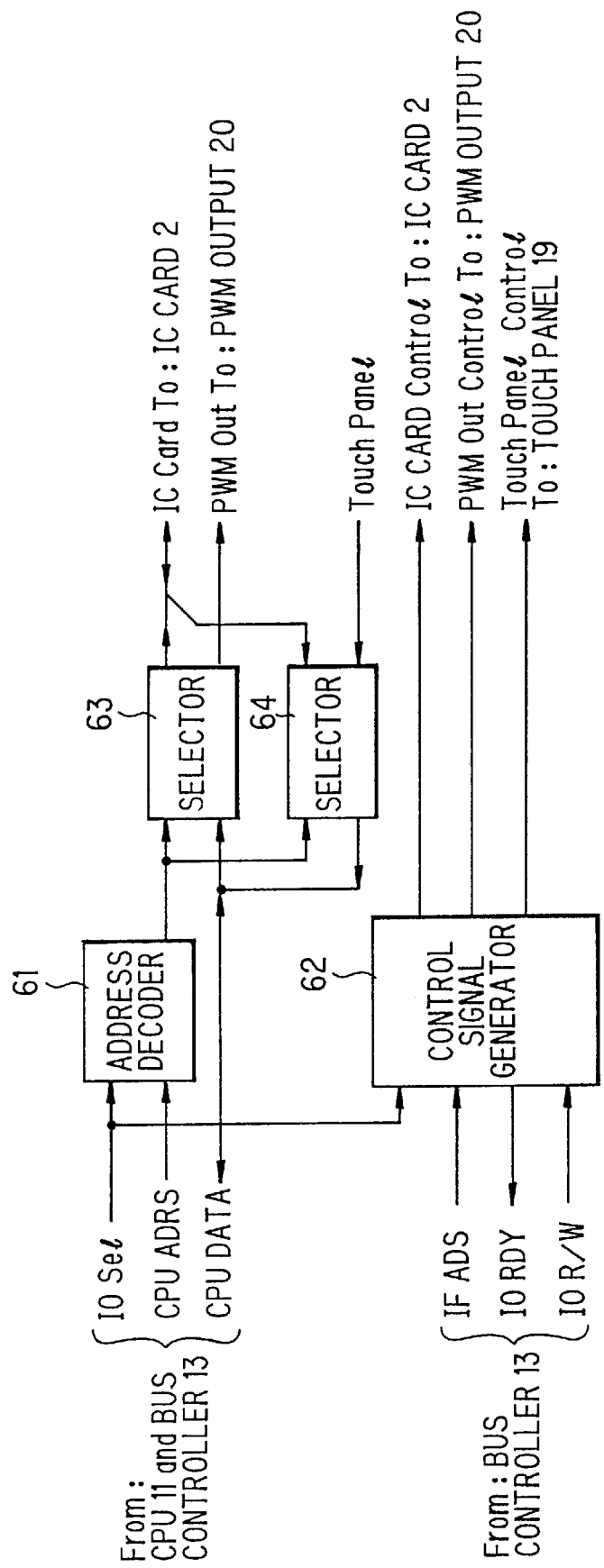
FIG. 6 is a block diagram illustrating a configuration of the I/O interface 24 of FIG. 2.

FIG. 6 is a block diagram illustrating configuration of the I/O interface 24, comprising an address decoder 61, a control signal generator 62 and two selectors 63 and 64.

The address decoder 61 generates a signal for designating one of the IC card 2, the PWM output 20 and the touch panel 19 to be accessed together with a signal for indicating their register address;

the control signal generator 62 generates control signals for controlling the IC card 2, the PWM output 20 and the touch panel 19, such as a clock signal and a reset signal for the IC card 2, for instance; and the two selectors 63 and 64 select data to be output and to be input respectively.

Figure 7:
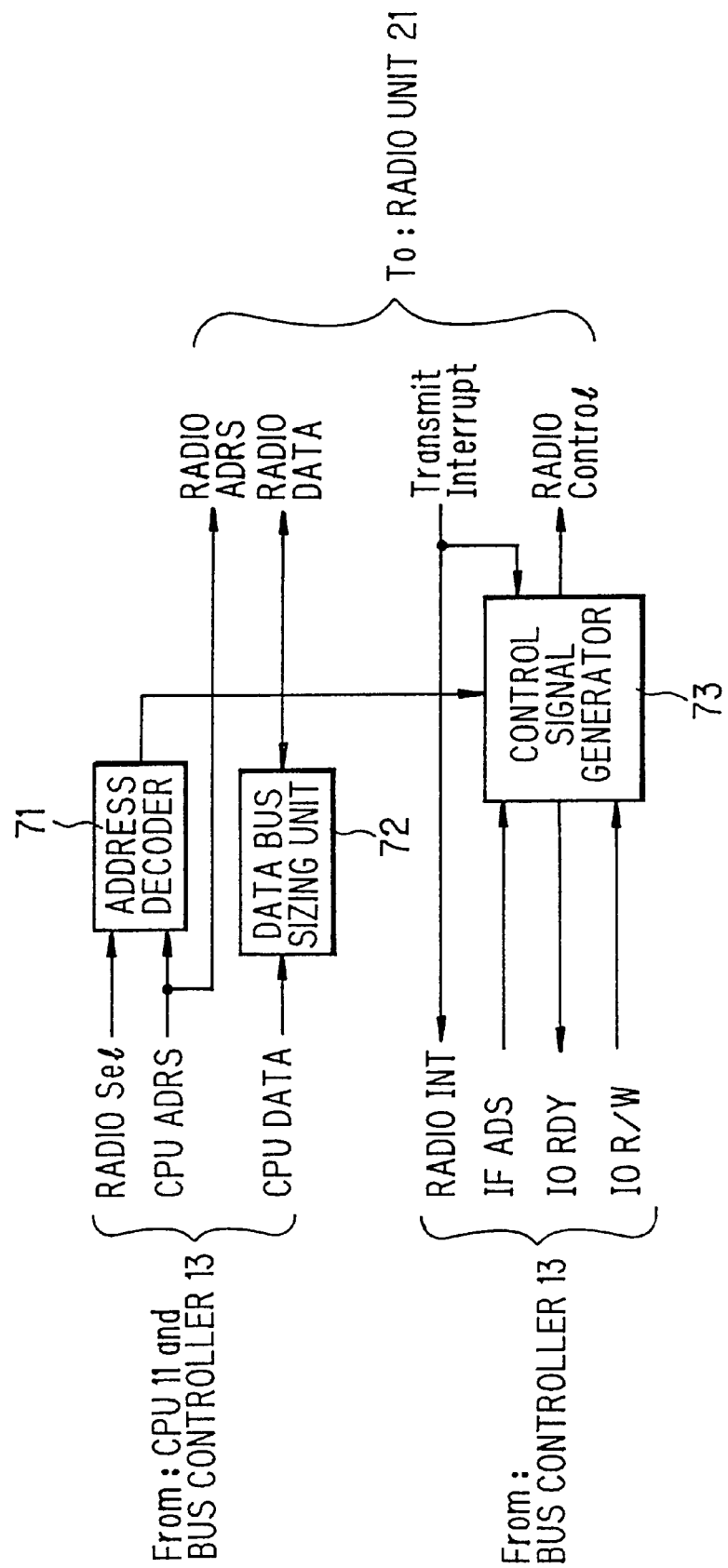
FIG. 7 is a block diagram illustrating a configuration of the radio interface 25 of FIG. 2.

FIG. 7 is a block diagram illustrating configuration of the radio interface 25, comprising an address decoder 71, a data bus sizing unit 72, and a control generator 73.

The address generator 71 generates a signal for indicating a register number of the radio unit 21 to be accessed;

the data bus sizing unit 72 converts bit width of data delivered from the CPU 11 into bit width appropriate for the register of the radio unit 21; and the control signal generator 73 generates signals for controlling the radio unit 21.

Figure 8:
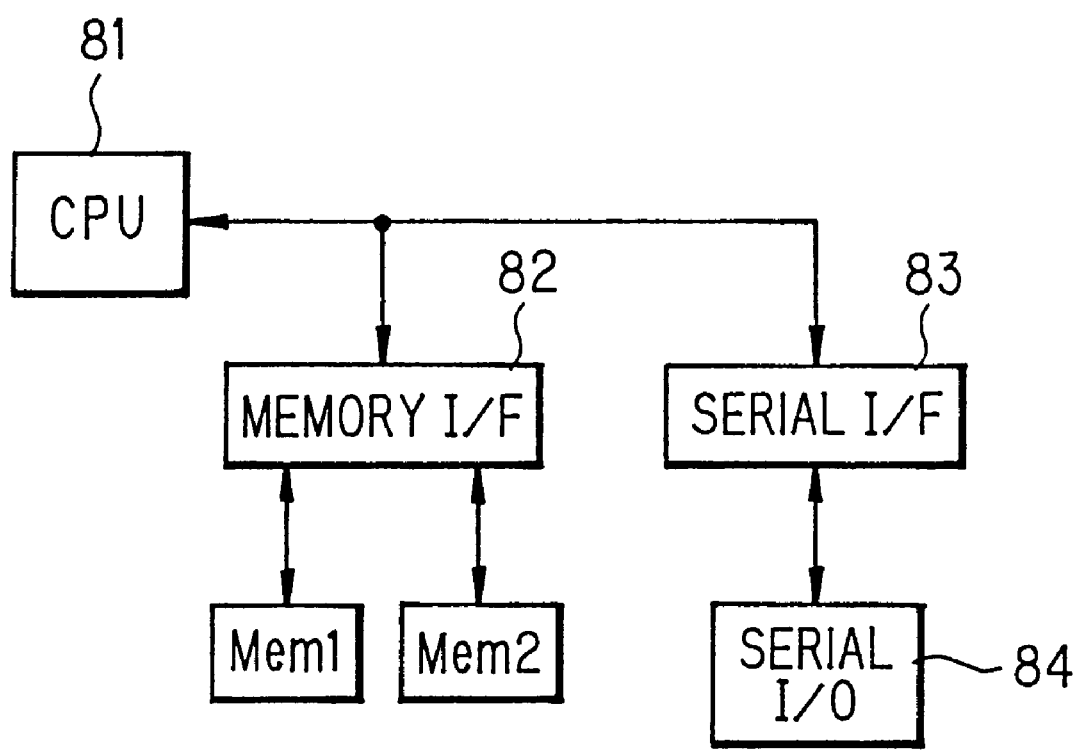
FIG. 8 is a block diagram illustrating a configuration of the IC card 2 of FIG. 1.

In the following paragraphs, a configuration of the IC card 2 is described referring to a block diagram thereof illustrated in FIG. 8.

The IC card 2 comprises a CPU 81, a memory interface 82, a first and a second memories Mem1 and Mem2, a serial interface 83, and a serial I/O port 84.

The CPU 81 performs operation processes in the IC card 2 such as password verification or addition/subtraction of the registered amount;

the first and the second memories Mem1 and Mem2 are used for storing programs to be executed by the CPU 81 and its work areas;

the memory interface 82 mediates the CPU 11 and the memories Mem1 and Mem2;

data, such as ID information or account information, are input and output to the IC card 2 through the serial I/O port 84; and the serial interface 83 mediates the serial I/O port 84 and the CPU 81.

Here, it is to be noted that the memory space of the IC card 2 is divided into the first and the second memories Mem1 and Mem2 for a security maintenance. For this purpose, contents of the first memory Mem1 are made unable to be revised or deciphered without a correct password, while the second memory Mem2 is freely accessible through the serial I/O port 85 from outside.

Now, operation of the IC card 2 will be described.

As for information prepared in the IC card 2, there is included an ID information for identifying its user and passwords necessary for accessing to his account in the financial organization 4, which are stored in the first memory Mem1.

The ID information comprises bank code, store code, deposit code, account number, customer name, etc., of the account.

The passwords consist of a user password and a bank password corresponding to the bank account. The user password is used for activating a communication program of the radio linked portable terminal 1 or verifying contents of the ID information in the IC card 2, for example, and so may to be changed by the customer. On the contrary, the bank password corresponds to the account contracted between the customer and the financial organization 4 and may not be changed by the customer himself.

Heretofore, the embodiment is described to have one bank password supposing a case the customer uses only one bank account, but when the customer uses a plurality of bank accounts, there should be prepared one password for each of the plurality of bank accounts.

In addition to the ID information and the passwords, there should be stored information easily confirmed by the third person, such as the stored amount to be confirmed when the IC card is used as a prepaid card, for example. Such information is prepared in the second memory Mem2, as above described.

Thus, the third person is permitted to read out the amount information and is inhibited from accessing security information such as the ID information or the passwords.

Figure 9:
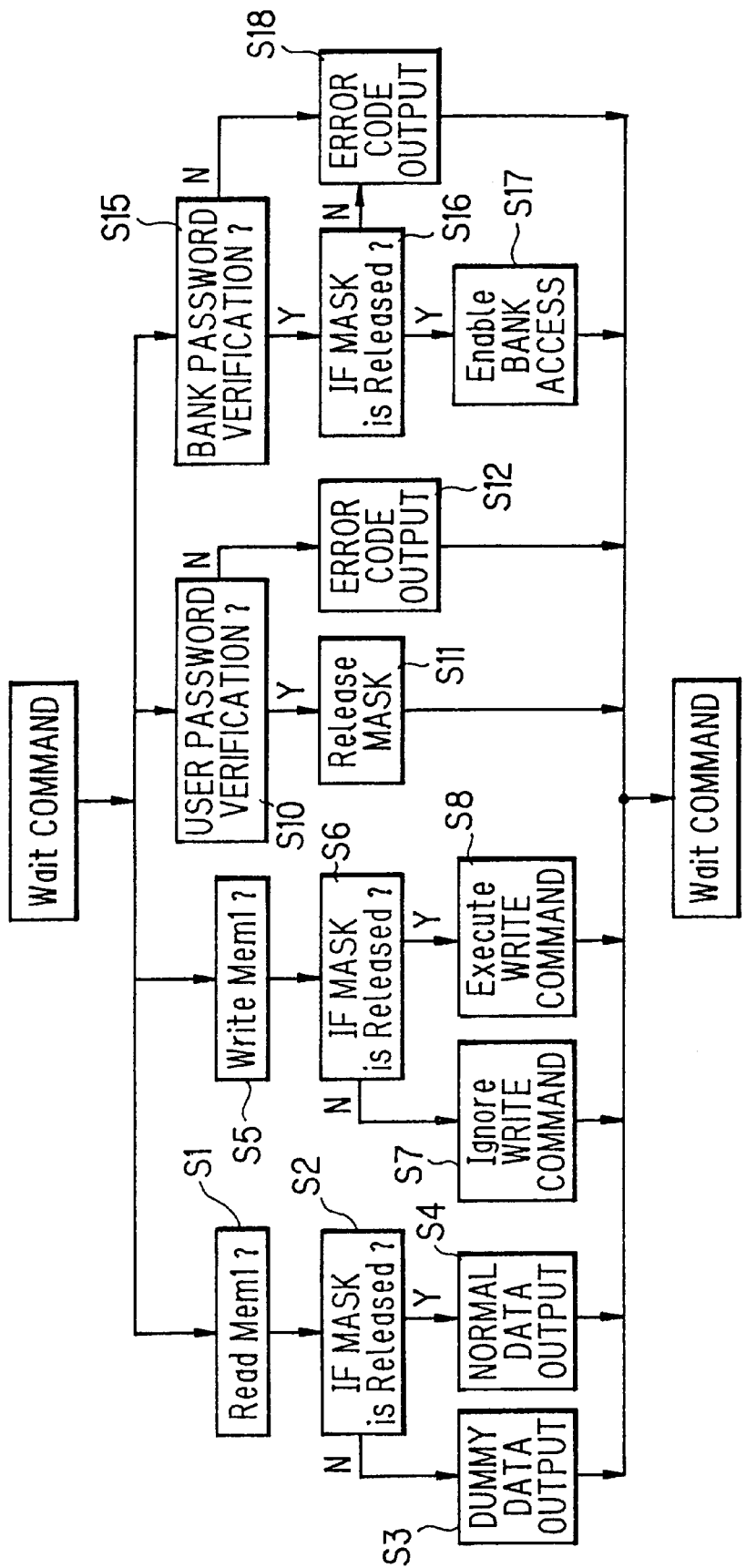
FIG. 9 is a flowchart illustrating read/write processes in the IC card 2.

FIG. 9 is a flowchart illustrating read/write processes in the IC card 2, wherein a command is input through the serial I/O port 84 and processed by the CPU 81, and the result thereof returned through the serial I/O port 84.

Referring to FIG. 9, when a memory read command for the first memory Mem1 is detected to be input (at step S1), the CPU 81 verifies whether the first memory Mem 1 is masked or released (at S2). The first memory Mem1 being released only with the user password, dummy data (nonsense data) are returned (at step S3) to the memory read command from a third person, while normal data returned (at step S4) to the memory read command from the customer himself. In a similar way, when a memory write command for the first memory Mem1 is transfered (at step S5), the memory masking is verified (at step S6), and the memory write command is executed (at step S8) when it is input by the customer and otherwise it is ignored (at step S7).

When a password is transfered to the IC card 2 as the user password, the CPU 81 verifies whether it is the same or not (at step S10), and releases masking of the first memory Mem1 (at step S11) when it is, otherwise returning an error code (at step S12).

When a password is transferred to the IC card 2 as the bank password, the CPU 81 verifies whether it is the same or not (at step S15), and confirms the masking is released or not (at step S16). When the bank password is input by the customer himself, the masking should be previously released and the access to the account of the financial organization 4 is enabled (at step S17). In case even a correct bank password is input by a third person accidentally, an error code is to be returned (at step S18), since the masking of the first memory Mem1 must be left unreleased in the case. The error code is returned also when the input password is found (at step S15) not to be the bank password.

Without the user password input, the ID information in the IC card 2 inserted to the radio linked portable terminal 1 is left in a mode unable to be read and written even by the customer, the possessor of the IC card 2, thus inhibitting the ID information to be seen by a third person. The user password is able to be changed, as beforehand described, by executing a program prepared in the radio linked portable terminal 1, on condition that the same user password with that previously registered by the customer is confirmed to be entered before execution of the program. The revision itself of the user password is performed in the IC card 2.

The bank password is registered by the financial organization 4 when the IC card 2 is issued and the same bank password is to be input when an amount is drawn from or transferred to the bank account in the financial organization 4. The bank password verification is performed also in the IC card 2, not by the radio communication which has risk to be slipped out.

Figure 10:
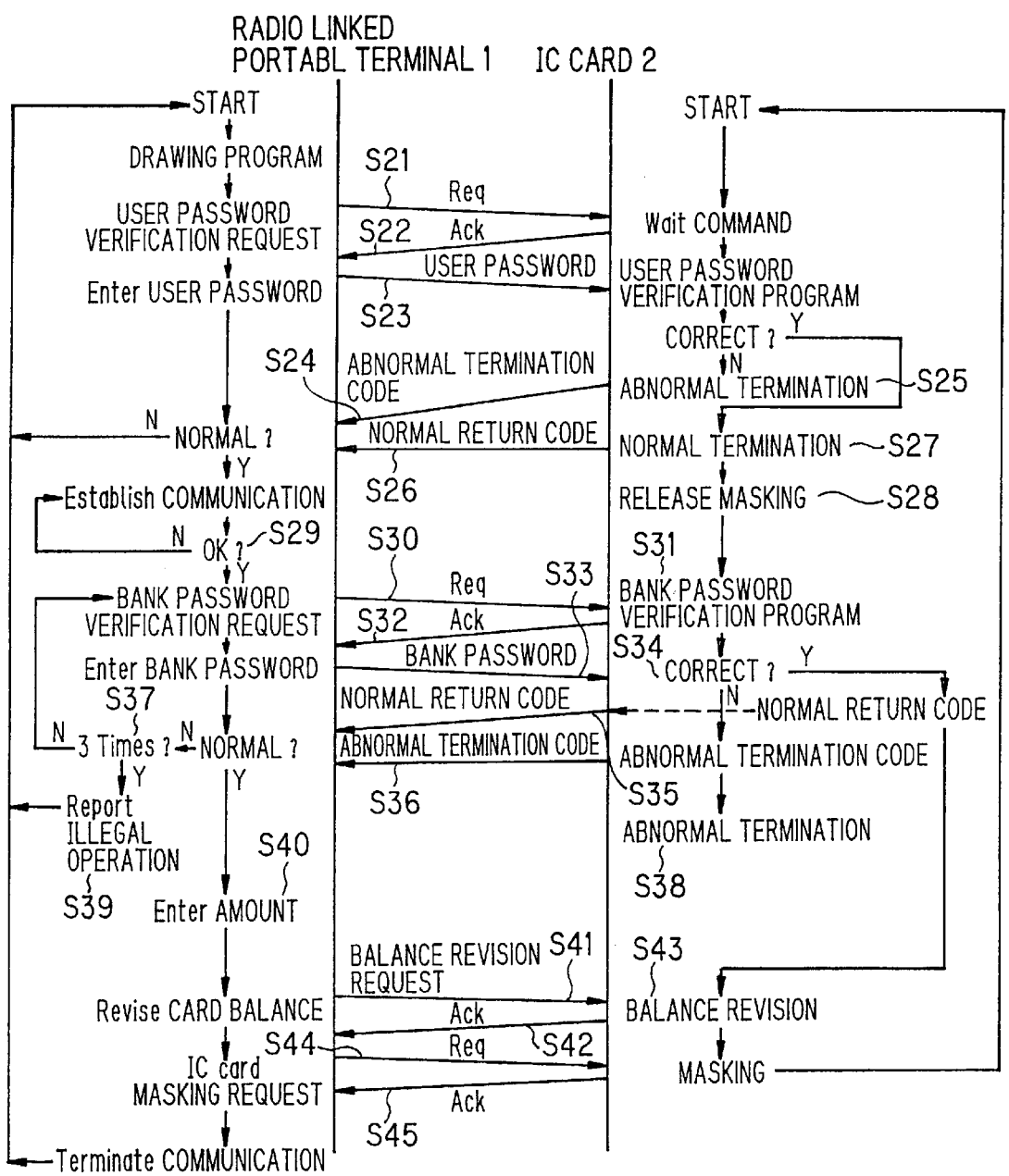
FIG. 10 is a flowchart illustrating detailed processes for drawing or depositing an amount from/to the bank account, wherein processes performed in the radio linked portable terminal are described in the left part and those performed in the IC card 2 are in the right part.

In the following paragraphs, detailed processes will be described for drawing or depositing an amount from/to the bank account in connection with a flowchart of FIG. 10, wherein the processes performed in the radio linked portable terminal are described in the left part and those performed in the IC card 2 in the right part.

First, the IC card 2 being inserted in the radio linked portable terminal 1, the user password is input through the touch panel 19 of FIG. 2. Then, a request signal Req is sent from the radio linked portable terminal 1 to the IC card 2 (at step S21), to which an acknowledge signal Ack is returned from the IC card 2 (at step S22). Receiving the acknowledge signal Ack, the user password is sent from the radio linked portable terminal 1 to the IC card 2 to be verified by a user password verification program activated (at step S23).

Thus, the input password being verified by the IC card 2, an error code is returned (at step S24) to the radio linked portable terminal 1 when it is not confirmed to be the same and the control process goes to abnormal termination (at step S25). When it is confirmed, returning a normal return code (at step S26) to the radio linked portable terminal 1, the user password verification program goes to normal termination (at step S27), and the masking of the first memory Mem1 is released (at step S28). Receiving the normal return code, communication session with the financial organization 4 is established (at step S29) in the radio linked portable terminal 1.

The communication session being established, another password is input through the touch panel 19 and another request signal Req is sent to the IC card 2 (at step S30) for activating a bank password verification program (at step S31), which returns an acknowledge signal Ack (at step S32).

Receiving the acknowledge signal Ack, the radio linked portable terminal 1 sends the input password to the IC card 2 (at step S33), which is verified by the IC card 2 (at step S34) and a normal return code is returned (at step S35) when the input password is confirmed to be the same with the bank password corresponding to the account in the financial organization 4.

When it is not confirmed, an error code is returned to the radio linked portable terminal 1 (at step S36). Receiving the error code, a user can retry the bank password input until three times (at step S37).

With three erroneous inputs, the IC card 2 is disabled with abnormal termination (at step S38), which is reported as an illegal operation to the financial organization 4 by the radio linked portable terminal 1 (at step S39).

Receiving the normal return code, the radio linked portable terminal 1 becomes ready to receive indication for adding or subtracting the amount registered in the IC card 2 (at step S40). When indicated, balance revising data are sent to the IC card 2 (at step S41), which revise balance data (at step S43) according to the revising data and returns an acknowledge signal Ack (at step S42).

After revising the balance, a masking request signal Req is sent from the radio linked portable terminal 1 to the IC card 2 (at step S44), according to which the IC card masks again the first memory Mem1 and returns an acknowledge signal Ack (at step S45).

Finally, the radio linked portable terminal 1 reports information of the amount revision, and the drawing/depositting process returns to the initial status.

For the input bank password verification at the step 34, bank password information is stored in the first memory Mem1 of the IC card 2 in cryptogram to be decoded making use of the input bank password itself as a secret-key as follows.

First, the masking of the first memory Mem1 storing the bank password information is released with the user password, with which the IC card 2 becomes prepared to draw an amount from the account in the financial organization 4. Then, the input bank password is transferred from the radio linked terminal 1 to the IC card 2, which is used as the secret-key for deciphering the bank password information stored in the first memory Mem1 together with a public-key stored there. After confirming coincidence of the deciphered bank password with the input bank password, the processes of registered amount revising at the step S40 to S44 of FIG. 10 are performed.

When an account dealing is accomplished, all buffer memory areas in the IC card 2 used for verifying the bank password are erased, and all buffer memory areas used in connection with the input bank password are erased as well in the radio linked portable terminal 1, when disconnection with the IC card 2 is detected, normally or abnormally.

Therefore, even when a third person might succeed to access the first memory Mem1, he can not obtain the bank password information but a cryptogram.

Figure 11:
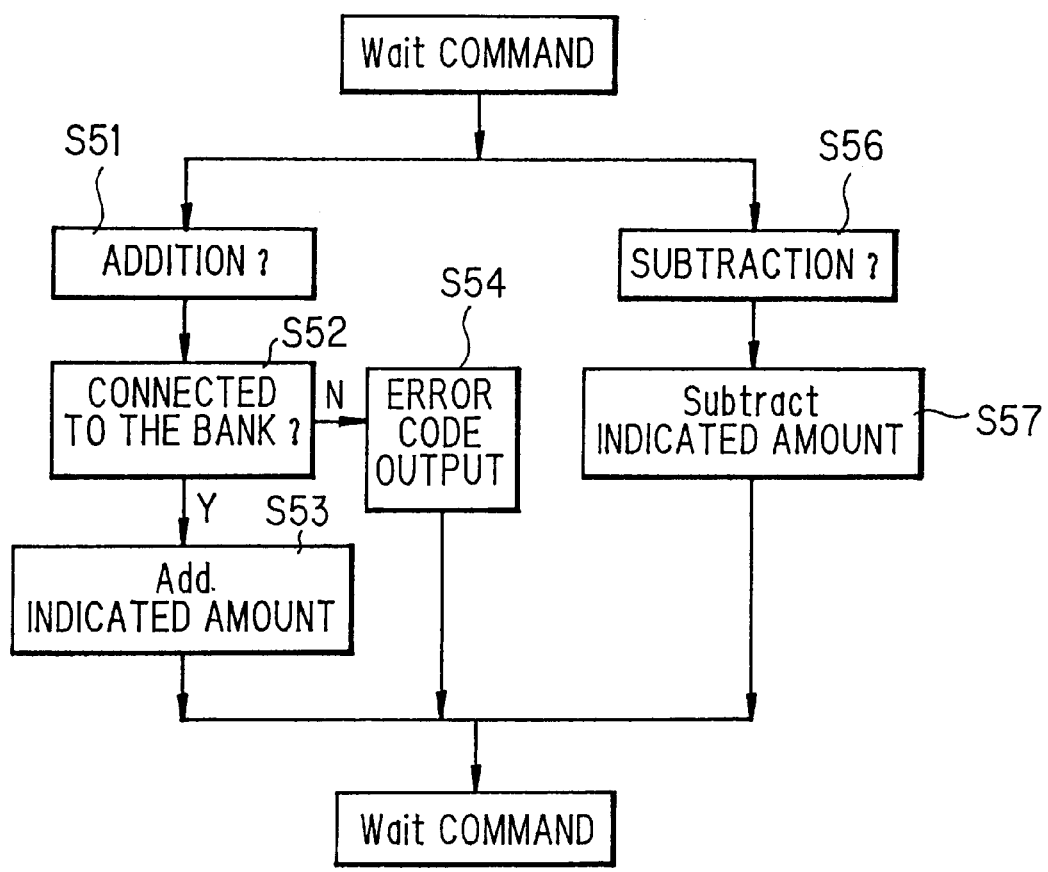
FIG. 11 is a flowchart illustrating processes for treating amount information in the IC card 2.

On the contrary, when the IC card is used as a prepaid card, the amount information therein is to be read and rewritten by a third person such as the register terminal 7 in the store 6. And, at the same time, it should be guarded against being rewritten freely by the customer or the third person independent of the bank account. For the purpose, processes illustrated in a flowchart of FIG. 11 is prepared in the embodiment.

When commanded to add the registered amount (at step S51), it is executed (at step S53) only after connection with the financial organization 4 is confirmed (at step S52) of the radio linked portable terminal 1, and otherwise the control process of the IC card 2 is returned to wait another command outputting an error code (at step S54). The connection confirmation is checked with a connection flag which is set to ON only when the correct user password and the correct bank password are both verified and, in addition, a connection OK code from the financial organization 4 is received through the radio linked portable terminal 1.

On the other hand, as for subtraction (at step S56) of the registered amount when shopping some goods, for example, it is executed (at step S57) without, the connection confirmation.

In the following paragraphs, crypto-system applied in the embodiment is described.

As for the crypto-system for the bank password information stored in the first memory Mem1 of the IC card 2, a common key crypto-system such as DES (Data Encryption Standard) system or FEAL (Fast Data Encipherment Algorithm) system may be applied. In the embodiment, the RSA public-key crypto-system is employed.

For ciphering a word into a cryptogram, a ciphering key is used, and the cryptogram can not be a deciphered without deciphering key. In the common key crypto-system, the cryptogram can be deciphered by the same key used for ciphering, while a cryptogram ciphered according to the public-key crypto-system needs another key, called the secret-key, to be deciphered in addition to a key called the public-key used for ciphering. The public-key can be derived from the secret-key, but the secret-key can not be obtained from the public key.

Figure 12A:
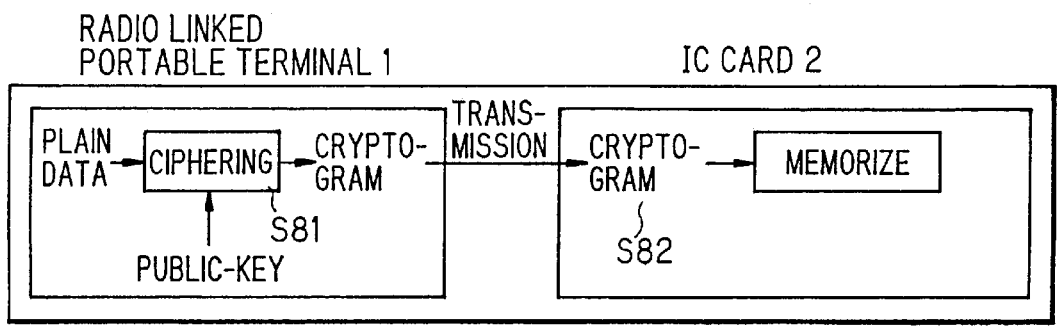
FIG. 12A is a flowchart illustrating an example of ciphering process performed in the radio linked portable terminal 1.

FIG. 12A illustrates a ciphering process, wherein data to be guarded in the radio linked portable terminal 1 or those read out from the IC card 2 are ciphered with the public-key into a cryptogram. The ciphering process is performed in the radio linked portable terminal 1 having larger ability than the IC card 2, in the example of FIG. 12A.

A plain text is ciphered making use of the public-key (at step S81) into a cryptogram, which is transferred to the IC card 2 in order (at step S82). Thus, the data to be guarded are prevented from illegal use even if it is accessed by a third person.

Figure 12B:
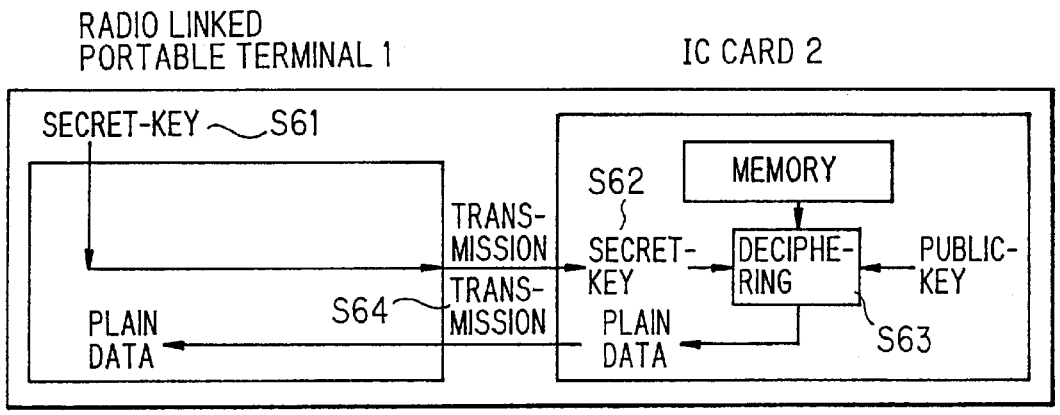
FIG. 12B is a flowchart illustrating an example of deciphering process performed in the IC card 2.

FIG. 12B is a flowchart illustrating an example of deciphering process, wherein the deciphering is performed in the IC card 2 with the public-key prepared in the IC card 2. The customer enters the secret-key (at step S61) by way of the touch panel 19 of the radio linked portable terminal 1. The secret-key is transmitted (at step S61) to the IC card 2 to be used for deciphering (at step S63) the cryptogram together with the public-key prepared in the IC card 2. The deciphered text is transferred to the radio linked portable terminal 1 (at step S64). In the example of FIG. 12B, the customer can read the guarded data even with a terminal other than his own radio linked portable terminal 1, since the deciphering process is accomplished in the IC card 2.

Figure 12C:
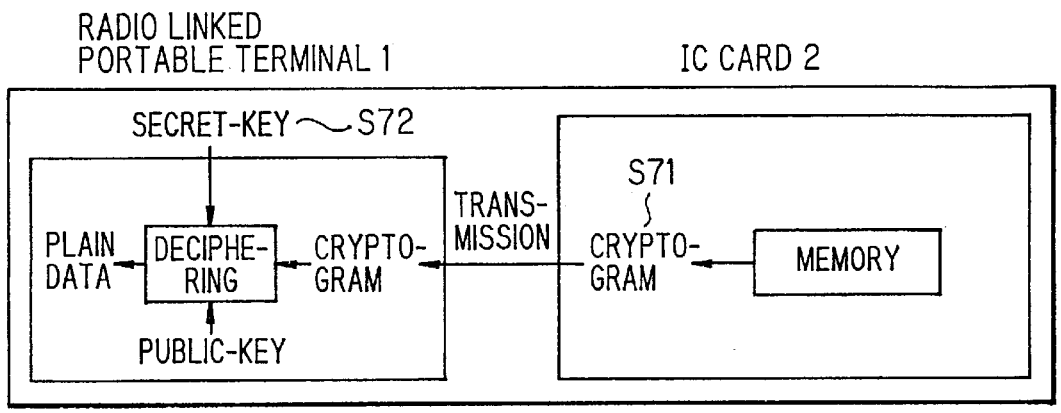
FIG. 12C is a flowchart illustrating another example of deciphering process performed in the radio linked portable terminal 1.

In the public-key crypto-system, the deciphering process may be performed in the radio linked portable terminal 1 or another other terminal such as a register terminal 7 as illustrated in FIG. 12C, since the public-key, useless without the secret key, need not be guarded.

In the deciphering process of FIG. 12C, the cryptogram is transferred (at step S71) to the radio linked portable terminal 1, for example, together with the public-key. Then, the secret-key is entered there (at step S72) by the customer, possessor of the secret-key, for deciphering the cryptogram transfered from the IC card 2.

Now, an example of preparation and usage of the public-key and the secret-key is described.

The public-key is generated from the bank password (to be used as the secret-key) corresponding to the bank account in the financial organization 4 and the serial number of the IC card. When issuing the IC card 2, the public-key generation is performed by the financial organization 4 which knows both the serial number and the bank password of the account. The public-key is registered in the first memory Mem1 of the IC card 2 to be sent to the customer together with cryptogram of the bank password and other ID information.

The IC card 2 thus issued is sent to the customer without masking of the first memory Mem1 thereof for enabling the customer to access the public-key, etc.

Receiving the IC card 2, the customer inserts it into his radio linked portable terminal 1 for setting up the public-key there. Detecting that the IC card 2 is connected, the radio linked portable terminal 1 requires delivering of the public-key to the IC card 2. Receiving the public-key, the radio linked portable terminal 1 stores it therein for using it for ciphering data to be guarded. Thus, the initialization of the radio linked terminal 1 is accomplished.

When the IC card 2 is used for shopping in the store 6, a certain store code is used for releasing masking of the first memory Mem1. The store code is delivered from the financial organization to contracted stores and registered in the register terminal 7 provided in each of the contracted stores. The register terminal 7 sends the store code when the IC card is inserted therein. Receiving the store code, the IC card releases masking of the first memory Mem1 in the same way as the user password is entered and the ID information, for example, is prepared to be read out.

Thus, the customer needs not enter the user password every time when shopping through the register terminal 7, providing as well easy use of the IC card 2 as a prepaid card.

When more security is required of the IC card 2 charged with a large amount, for example, the IC card may be set optionally by the customer to reject the store code and to become ready only when the correct user password is entered through the register terminal 7.

For drawing an amount to be paid from the IC card 2, the register terminal 7 sends a-payment command. The IC card 2 subtracts the amount from its registered amount and returns an acknowledge signal ACK to the register terminal 7 when the subtraction is normally performed.

The IC card 2 can be charged also through an ATM of the financial organization 4. In this case, the store code is sent from the ATM for releasing the first memory Mem1 as from the register terminal 7. However, the charging itself is made only after correct bank password is entered and confirmed in the same way as it is charged through the radio linked portable terminal 1.

Heretofore, the present invention is described in connection with an embodiment of the radio linked portable terminal 1 of FIG. 2. However, various applications can be considered in the scope of the invention. For example, the radio linked portable terminal 1 can be realized with a notebook computer connected with a PHS (Personal Handyphone System) hand set and the IC card 2 can be prepared according to PCMCSA (Personal Computer Memory Card Standard Association) standard.

Thus, according to a banking system of the invention equipped with a radio linked portable terminal;

- the IC card can be charged at anytime at anywhere without ATM, since it is equipped with a radio linked portable terminal having radio communication means for linking the IC card to a center terminal of corresponding financial organization after confirming passwords entered by possessor of the IC card;
- the IC card having no input key nor display, there is little risk of information plagiarism therefrom because of password leakage, and the guarded information could not be used illegally even if it were read out, as it is stored therein in cryptogram;
- the IC card can be used as practically as a prepaid card, since it needs no complicated handling for entering password when shopping; and
- the IC card need not be provided with a battery, preventing problem of battery discharge and illegal use too, since the IC card does not function on its own power.

What is claimed is:

1. A banking system comprising:

radio communication means to be connected to a center terminal of a financial organization by way of a radio communication network for drawing an amount from and depositing an amount to a bank account in said financial organization, said bank account being identified by a bank password;

wherein said radio communication means includes a radio linked portable terminal and an IC card to be connected to said radio linked portable terminal, said IC card comprising a memory for storing information of an available amount reserved for the IC card and a processor for adding an amount drawn from said bank account to said available amount and subtracting an amount to be deposited to said bank account from said available amount; and means for confirming coincidence of a first input password entered from outside with said bank password stored within, said IC card having no display for displaying said first input password.

2. A banking system recited in claim 1, wherein said IC card has no input key for inputting said first input password.

3. A banking system recited in claim 1, wherein said first input password is entered through said radio linked portable terminal and transferred to said IC card.

4. A banking system recited in claim 1, wherein said IC card further comprises means for confirming coincidence of a second input password entered from outside with a user password stored therein.

5. A banking system recited in claim 1, wherein said radio linked portable terminal comprises:

a memory for storing a public-key; and means for ciphering information to be guarded into a cryptogram to be stored in said IC card making use of said public-key.

6. A banking system recited in claim 5, wherein said radio linked portable terminal further comprises:

means for reading out and deciphering cryptograms stored in said IC card making use of said public-key and an input password entered as a secret-key.

7. A banking system recited in claim 1, wherein said IC card further comprises:

a memory for storing a public-key; and means for reading out and deciphering cryptograms stored therein making use of said public-key and an input password entered as a secret-key through said radio linked portable terminal and transferred thereto.

8. A banking system recited in claim 1, wherein said radio linked portable terminal comprises a power supply for supplying said IC card.

* * * * *